July 25, 1967   P. J. LONG, JR   3,332,677
VEHICLE LEVELING SYSTEM
Filed March 30, 1965   4 Sheets-Sheet 1
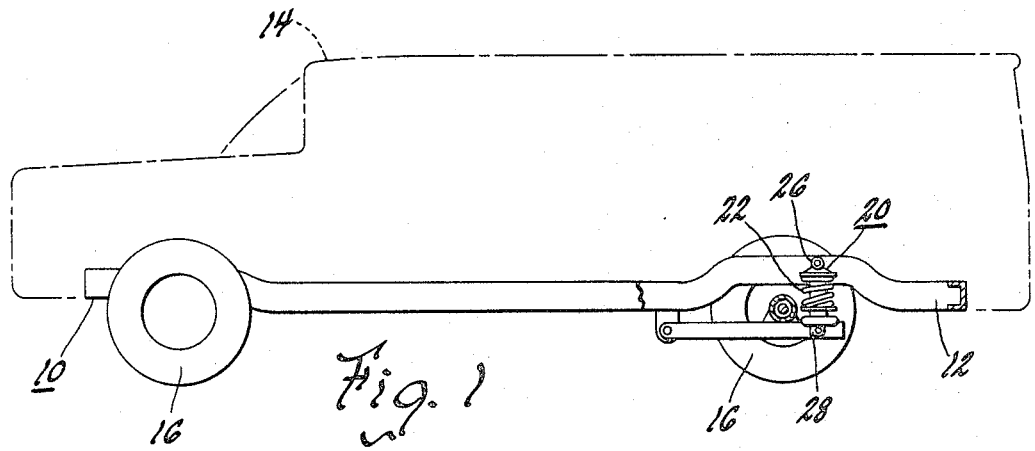
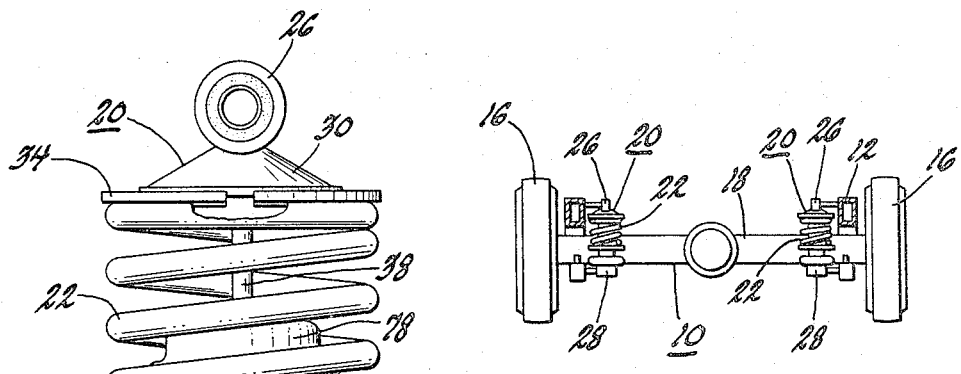
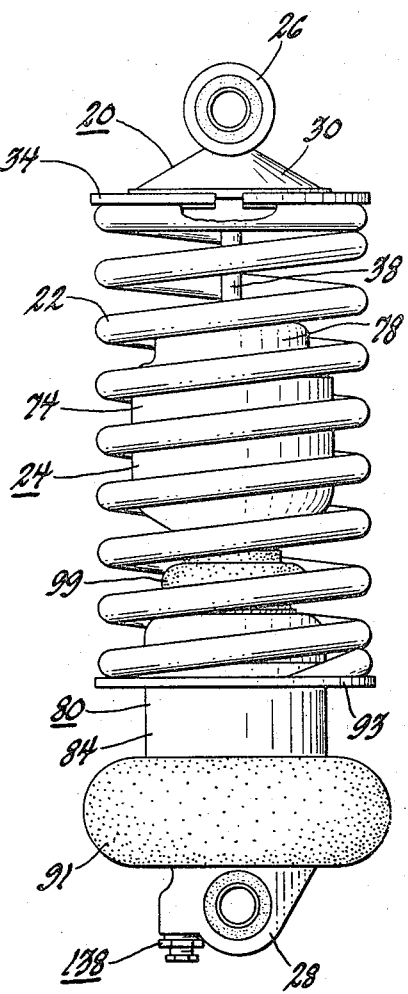
INVENTOR.
Paul J. Long, Jr.
BY
J. C. Evans
HIS ATTORNEY INVENTOR.
Paul J. Long, Jr.
BY J.C. Evans
HIS ATTORNEY

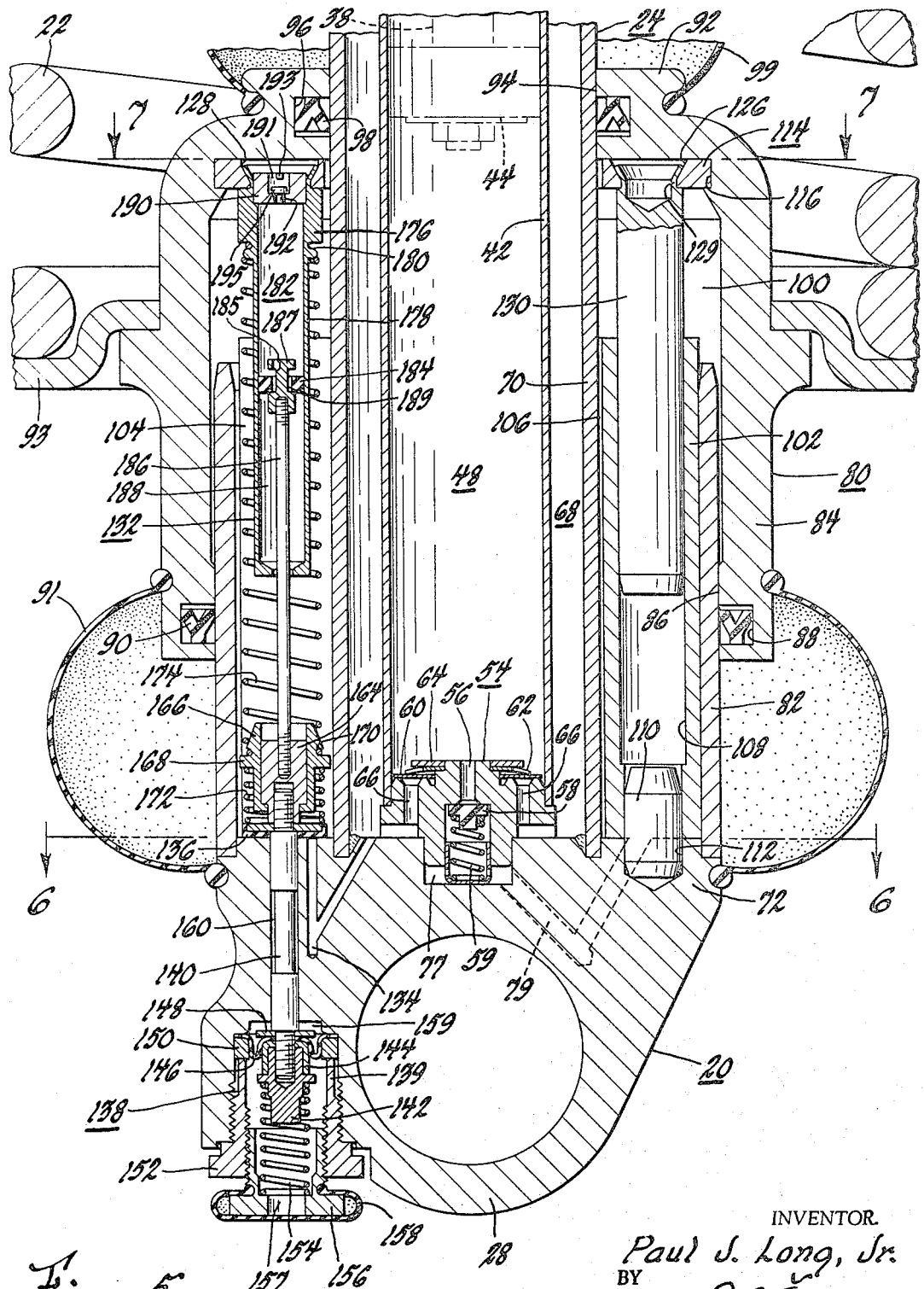

INVENTOR.
Paul J. Long, Jr.
BY J.C. Evans
HIS ATTORNEY

United States Patent Office 3,332,677
Patented July 25, 1967

3,332,677
VEHICLE LEVELING SYSTEM
Paul J. Long, Jr., Dayton, Ohio, assignor to General Motors Corporation, Detroit, Mich., a corporation of Delaware
Filed Mar. 30, 1965, Ser. No. 443,873
10 Claims. (Cl. 267—34)

This invention relates to vehicle leveling systems and more particularly to fluid operated vehicle leveling systems of the type including self-pumping units.

One problem in vehicle suspension systems having primary coil springs and the like therein for maintaining the height relationship between the vehicle body and frame and its road engaging wheel and axle assemblies occurs when additional loading is added to the sprung mass over and above that present under normal loading conditions. In such cases, the primary spring components are often undesirably deflected to reduce the normal height relationship between the vehicle body and its axle. In such cases, the riding qualities of the vehicle are adversely affected and there is an increased tendency for the body to bottom or impact against the supporting axle structure.

One solution to this problem is the provision of a pressurizable hydraulic unit for adjusting the position of one of the seats of the primary spring suspension component to compensate for load produced deflections therein by effectively fluidly jacking the vehicle body away from its supporting axle structure when additional loadings are placed on the sprung mass represented by the vehicle body. Such a unit is illustrated in United States Patent No. 3,123,349, issued Mar. 3, 1964, to Cislo, which discloses a hydraulic unit controlled by load responsive valve means for adjusting a spring seat to accomplish this purpose. In the arrangement illustrated in the Cislo patent the load responsive valve unit controls both fluid flow into and out of the hydraulic unit in response to load changes. While the Cislo arrangement is suitable for its intended purpose, its valve control is rather complex and, moreover, the suspension unit depends upon an auxiliary pressure source to be operative.

An object of the present invention, therefore, is to improve vehicle leveling systems by the provision of a combination suspension unit including a primary load supporting coil spring supported between a fixed spring seat and a movable spring seat and a pressurizable hydraulic jack unit including a movable member for adjusting the position of the movable spring seat under the control of an improved regulating valve having damping means associated therewith for regulating the pressure in said hydraulic jack assembly at a point closely correlated to the amount of loading on an unsprung mass.

A further object of the present invention is to improve automatic vehicle suspension units of the type having a combination coil spring supported by a hydraulically adjusted spring seat pressurizable by the pumping action of a hydraulic shock absorber unit concentrically arranged within the coil spring wherein the hydraulic shock absorber has a prepressurized reservoir for maintaining the hydraulically actuated movable spring seat continuously under pressure to improve the responsiveness of the adjustment thereof upon changes in the load on the sprung mass.

A further object of the present invention is to improve automatic leveling systems for association with the sprung and unsprung masses of a vehicle or the like by the provision of a combination shock absorber and primary coil spring assembly operatively related through a hydraulic jack unit including a movable member for adjusting the position of a movable spring seat to compensate for spring deflection wherein the shock absorber includes a prepressurized reservoir for continually maintaining the hydraulic jack unit under pressure and wherein the shock absorber is characterized by a positive displacement unidirectional pumping action to increase the pressure in the hydraulic jack above its continuously pressurized condition under the controlling action of a load responsive valve means operative upon sensing a command signal from the pressure in the hydraulic jack unit.

Yet another object of the present invention is to improve automatic leveling systems for association with the sprung and unsprung masses of a vehicle by the provision of a combination shock absorber and coil spring assembly operatively associated by a hydraulic jack unit and including a movable member for adjusting the position of a movable spring seat to compensate for coil spring deflection wherein the shock absorber includes a prepressurized reservoir for maintaining a continual pressure in the hydraulic jack and means for positively displacing fluid into said jack for increasing the pressure therein to a predetermined point under the control of valve means including means sensing the pressure in the jack unit and operative in response to load changes on the coil spring to selectively exhaust pressurized fluid from the jack back to the pressurized reservoir to adjust the movable spring seat for maintaining a predetermined height relationship between the sprung and the unsprung masses; and to improve such leveling systems by including improved valve damping means in association with the valve means for preventing undesirable oscillations thereof in response to pressure changes in the hydraulic jack whereby the movable spring seat is maintained at or near a particular adjusted position for a particular load on the sprung mass irrespective of changes in inertial forces on the sprung mass.

Further objects and advantages of the present invention will be apparent from the following description, reference being had to the accompanying drawings wherein a preferred embodiment of the present invention is clearly shown.

In the drawings:

FIGURE 1 is a view in side elevation of a vehicle including the automatic leveling system of the present invention;

FIGURE 2 is a view in end elevation of a vehicle including the automatic leveling system of the present invention;

FIGURE 3 is an enlarged view in elevation of the suspension assembly of the present invention;

FIGURE 5 is an enlarged view in vertical section of hydraulic jack and control valve units in the assembly of FIGURE 4;

Figure 4:
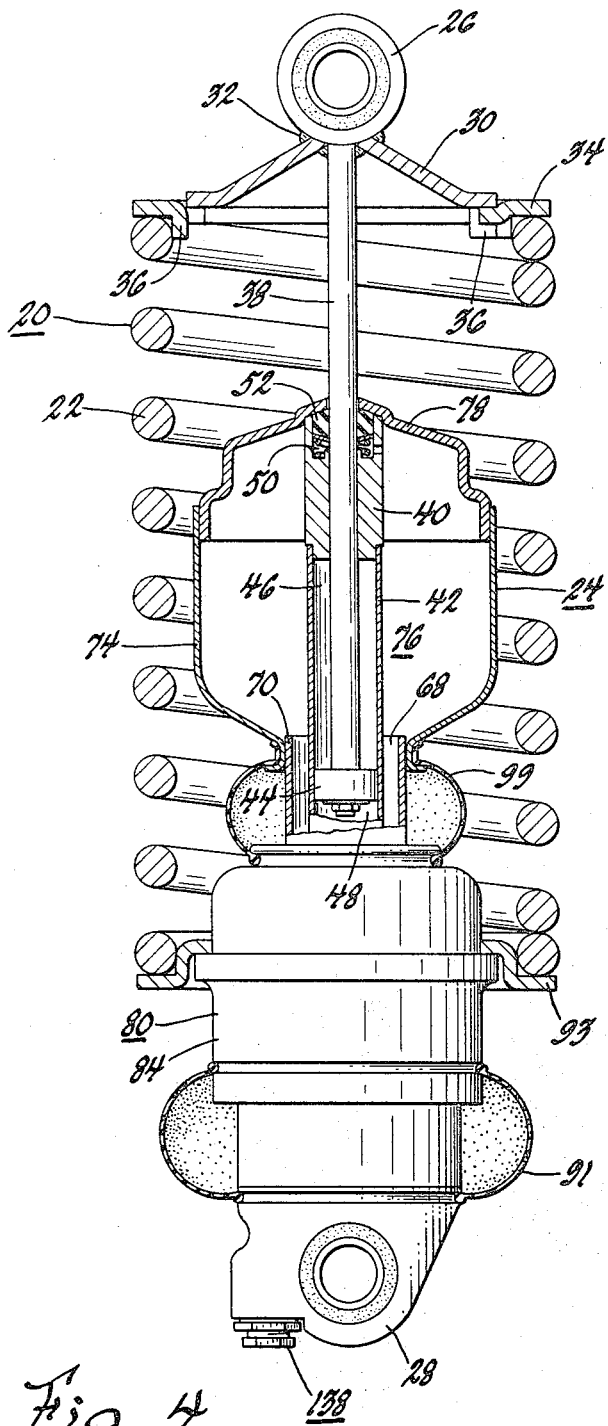
FIGURE 4 is an enlarged view partially in section of the assembly of FIGURE 3.

Referring now to the drawings, in FIGURES 1 and 2 a vehicle 10 is illustrated comprising a chassis frame 12 and a body 14 supported thereon representing a sprung mass which is supported upon an unsprung mass represented by ground engaging wheels 16 supported off front suspension assemblies (not shown) and a rear axle housing 18. Between the chassis frame 12 and the axle housing 18 inwardly adjacent each of the wheels 16 is connected a self-pumping leveling suspension assembly 20 of the present invention.

As best seen in FIGURE 3, each assembly 20 includes a primary coil spring 22 concentrically disposed about a double, direct-acting hydraulic shock absorber unit 24 having connection fittings 26, 28 at either end thereof connected, respectively, to the chassis frame 12 and the axle housing 18.

Referring now to FIGURE 4, the shock absorber 24 is more particularly shown as including an upper movable cover plate 30 secured to the upper connection fitting 26 by suitable fastening means such as welding at 32. An upper spring seat member 34 having a plurality of circumferentially located depending tabs 36 thereon is fastened to the underside of the cover 30 so that the upper end of the primary coil spring 22 is received against the underside of the seat member 34 and located adjacent the periphery thereof by the tabs 36.

An elongated reciprocal rod 38 is secured at one end thereof to the upper cover plate 30 and has the opposite end thereof directed interiorly of the shock absorber concentrically of a rod guide 40 and a cylinder 42. On the opposite end of the rod 38 within the cylinder 42 is secured a piston 44 slidably sealingly supported by the inner surface of the cylinder 42 for reciprocal movement relative thereto. The piston 44 serves to divide the cylinder 42 into an upper variable volume rebound chamber 46 and a lower variable volume compression chamber 48. An upper opened end of the pumping cylinder 42 is closed by the rod guide member 40 which has a cavity 50 therein in which a rod seal assembly 52 is located for preventing fluid leakage from the rebound chamber 46 outwardly of the upper end of the shock absorber 24.

At the opposite end of the cylinder 42, as seen in FIGURE 5, is located a base valve plate 54 closing the lower open end of the cylinder 42 and having a central opening 56 therethrough including a valve element 58 biased closed by a spring 59 for controlling fluid flow from the compression chamber 48. The assembly 54 also includes a rebound flow disc valve 60 of annular form biased into a closed position by a spring 62 retained on the upper surface of the valving assembly 54 by a snap ring 64 to control fluid flow through openings 66 in the plate 44 communicating the compression chamber 48 with a fluid reservoir space 68 formed between the cylinder tube 42 and a concentrically arranged reservoir forming tube 70. The tube 70 has one end thereof fit into the base 72 of the lower connection fitting 28 to close the open end of the reservoir space 68.

The upper end of the reservoir tube 70, as seen in FIGURE 4, fits into a reservoir bulb member 74 forming a space 76 communicating with reservoir space 68. The member 74 has an upper open end closed by an inverted cup-shaped cover member 78 that also serves as the cover for the seal assembly 52.

The illustrated shock absorber 24 includes a suitable hydraulic fluid therein acted upon by the piston assembly 44 upon relative movement between the sprung and the unsprung masses to produce fluid damping of such relative movement by restricting fluid flow across valving components in the piston 44 which are more specifically set forth in United States Patent No. 2,785,774, issued Mar. 19, 1957, to Long et al. The damping action also depends in part upon the flow of fluid across the valving components on the base valve plate 54.

More particularly, upon relative movement of the sprung mass toward the unsprung mass the piston 44 displaces fluid from the compression chamber 48 by a unidirectional pumping action through the opening 56 and across the valving assembly 58 and exteriorly of the shock absorber through openings 77 and 79 in base 72 to compensate for the volume in the cylinder 42 displaced by movement of the rod 38 as it enters the cylinder 42. An additional damping effect is produced by fluid flow from the compression chamber 48 into the rebound chamber 46 across the valving components in the piston 44.

Upon relative movement of the sprung mass away from the unsprung mass, the piston 44 is moved upwardly in the pumping cylinder 42 to force fluid from the rebound chamber 46 across valving components in the piston 44 into the compression chamber 48 to produce a predetermined rebound damping action. To supply fluid to make up the volume of the rod 38 passing outwardly of the pumping cylinder 42, fluid is drawn from the reservoir 68 through the passageways 66 across valve disc 60 into the compression chamber 48.

The above-described fluid flow for effecting damping action is merely representative of a typical double, direct-acting hydraulic shock absorber fluid circuit with it being understood that other like structures with modified fluid flow paths would be equally suited for use in the suspension unit 20 of the present invention.

In accordance with certain principles of the present invention, the shock absorber 24 serves as a positive displacement unidirectional pump by directing fluid outwardly through openings 77, 79 that in turn communicate with a hydraulic jack assembly 80 concentrically disposed between the coil spring 22 and the lower end of the shock absorber unit 24. The jack assembly 80 includes a jack tube 82 fixed at its lower end to the base 72 of the lower connection fitting 28 and a relatively movable, cylindrically shaped piston member 84 telescopingly received about the jack tube 82. The piston 84 has an inner surface portion 86 at the lower end thereof formed continuously therearound that slidingly bears against the outer surface of the jack tube 82 for guiding relative movement between the tube 82 and piston 84.

Below the surface 86, the piston 84 has a recess 88 formed therein supportingly receiving an annular resilient seal member 90 for sealing the lower end of the jack unit 80. A bellows seal 91 connects between piston 84 and the base 72 of fitting 28 to serve as a lower dust cover on the jack assembly 80. A movable spring seat 93 is secured on the outside of jack piston 84 above the seal 91 for supportingly receiving the lower end of spring 22.

The upper end 92 of the piston 84 is slidably supported at an opening 94 therethrough by the outer surface of the reservoir tube 70 and includes a recess 96 therein that receives an annular resilient sealing member 98 for slidably sealingly engaging the reservoir tube 70 to prevent leakage from the top of the jack assembly 80. In addition, a bellows seal 99 is clamped over the end 92 of piston 84 and a flanged end on the reservoir bulb 74 to serve as an upper dust cover for the jack assembly 80.

Figure 9:
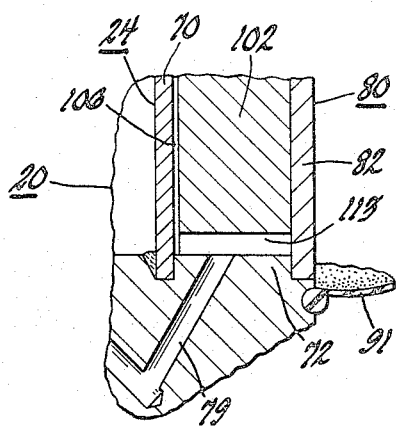
FIGURE 9 is a section along line 9—9 of FIGURE 6.

The movable cylinder 84 and fixed tube 82, together, form a variable volume pressurizable cavity 100. Within the cavity 100 is located a filler ring 102, best shown in FIGURES 5 and 7 as having a broken annular form including an opening 104 through the complete depth of the ring 102 and having its inner peripheral surface spaced outwardly of the outer surface of reservoir tube 70 to form a fluid space 106 therebetween. The member also includes an opening 108 therethrough into which one end of a connecting pin 110 extends having its opposite end fit into an opening 112 in the base 72 for preventing relative rotation between the filler ring 102 and the base 72. As best seen in FIGURE 9 the ring 102 has a groove 113 in its base for connecting supply opening 79 in base 72 with the jack cavity 100 through space 106.

Figure 7:
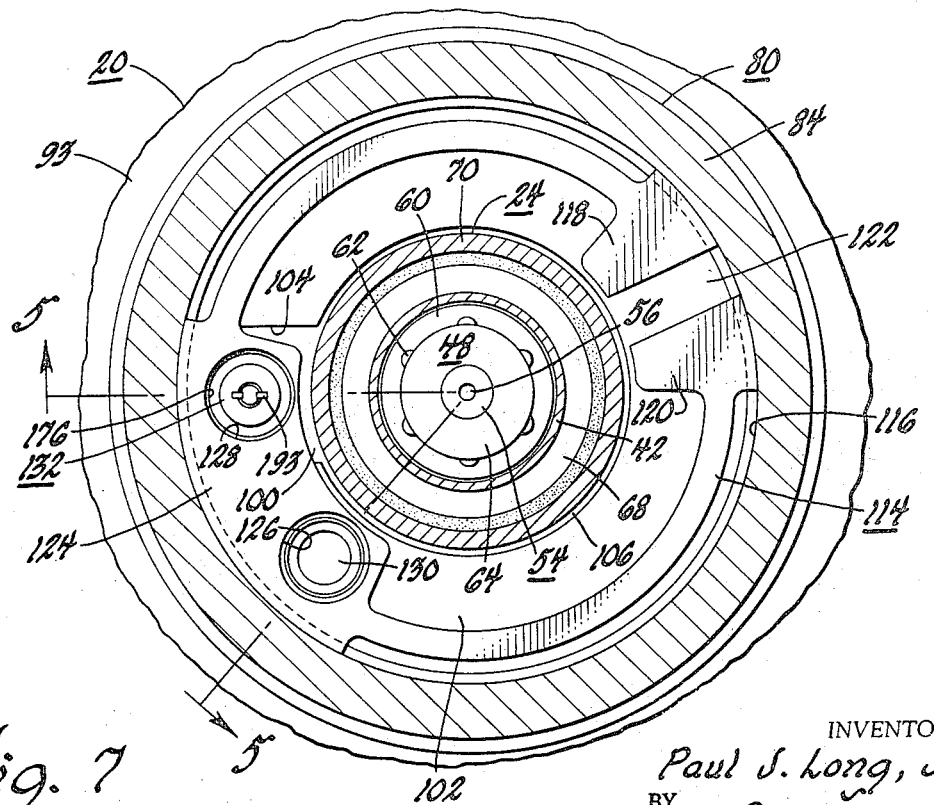
FIGURE 7 is a view in horizontal section taken along the line 7—7 of FIGURE 5.

At the upper end of the piston 84 within the cavity 100 is located a snap ring assembly 114 fit into a recess 116 in the piston 84. The snap ring assembly 114 is best shown in FIGURE 7 as having enlarged end portions 118, 120 spaced apart by an opening 122 located diametrically opposite a reinforced arcuate section 124 having a pair of holes 126, 128 therein. The opening 126 receives the upper end 129 of a guide pin 130 in a press fit relationship. The pin 130 depends downwardly therefrom through the opening 108 in the filler ring whereby the snap ring assembly 114 is held against relative rotation with respect to the base 72. The guide pin 130 also serves to align the opening 126 in the snap ring assembly 114 with the opening 106 in the filler ring 102 to assure concentric axial alignment of the operative components of a fluid control valve assembly 132 located within the opening 104 in the filler ring 102.

The valve assembly 132, in accordance with certain of the principles of the present invention, is responsive to changes in the load on the sprung mass to control fluid flow from the jack cavity 100 back to the reservoir space 68 through a passageway 134 formed in the base 72 as best seen in FIGURE 5. The assembly 132 includes a valving member 136 that overlies the opening from the cavity 100 into the passageway 134 and is moved into an open and closed relationship with respect thereto by a diaphragm actuator assembly 138 located in an opening 139 within the lower connection fitting 28 on one side thereof through a valve stem 140 directed through the valving element 136 at one end thereof and having the opposite end thereof threadably received within a piston nut 142 of the diaphragm actuator assembly 138. On one end of the piston nut 142 is carried a piston 144 that engages the underside of a resilient diaphragm member 146 to hold it in place against a washer 148 abutting a shoulder formed on the end of the valve stem 140. At its outer periphery the diaphragm 146 is held against a shoulder in opening 139 by a thrust washer 150 located in sealing engagement thereagainst by a tubular retainer nut 152 threadably received within the diaphragm actuator opening in the lower connection 28. The piston 144 and diaphragm 146 are biased upwardly by a constant bias coil spring 154 having one end thereof located against the piston nut 142 in surrounding relationship therewith and the opposite end thereof biased against the inner surface of an adjusting nut 156 threadably received within the retaining nut 154. The diaphragm 146 is exposed to atmosphere on its underside through an opening 157 in nut 156 which opening is covered by a dust shield member 158 connected over the end of nut 156.

Figure 8:
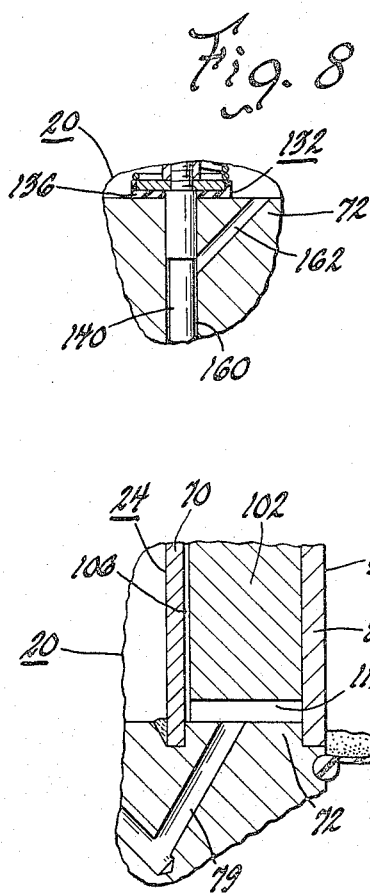
FIGURE 8 is a vertical sectional view taken along the line 8—8 of FIGURE 6.
Figure 6:
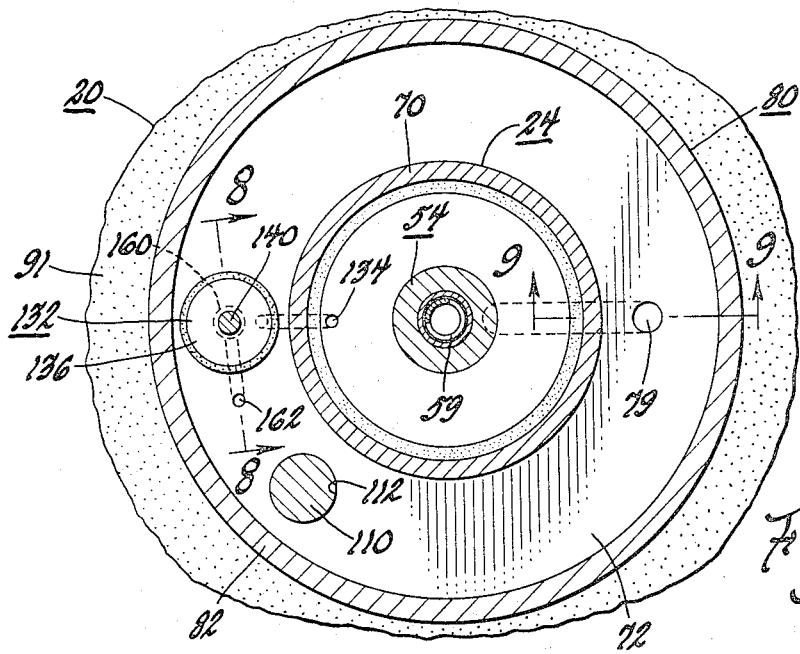
FIGURE 6 is a view in horizontal section taken along the line 6—6 of FIGURE 5.

The diaphragm 146 in conjunction with opening 139 forms a pressurizable cavity 159 in the diaphragm actuator assembly 138 which communicates with the pressurizable variable volume cavity 100 in the jack 82 across the valve stem surface and through a clearance opening 160 between the ends of the valve stem 140 which communicates with a passageway 162 in the base 72 as best seen in FIGURES 6 and 8.

By virtue of this construction, the pressure in the jack will cause the diaphragm to produce a valve closing action opposed by the force of the constant bias spring 154.

The control valve assembly 132 further includes a lift nut 164 threadably connected on the upper end of the valve stem 140 within the filler ring opening 104. Slidably received over the nut 164 is a movable spring seat 166 having an outwardly directed circumferential flange 168 on its outer surface between its ends. The spring seat 166 also includes a groove 170 therein above the flange 168. Between the undersurface of the flange 168 and the upper surface of the valving element 156 is disposed a coil spring 172 that serves as a tolerance take-up spring in the valve assembly 132. Above the spring seat 164 is located a jack extension control spring 174 that is held in tension between the spring seat 166 and the upper end 176 of a tubular spring guide 178 by connecting one end of the spring 174 into the groove 170 and the opposite end thereof into a groove 180 in the end 176. The end 176 is swaged over at the opening 128 in snap ring 114 to fix the spring guide 178 for movement with the jack piston 84.

The spring 174 is thereby arranged concentrically in guided relationship within the filler ring opening 104 by the tubular guide member 178 and serves to direct a valve opening force against the valving member 136 when the spring seat engages the underside of the lift nut 164.

The end 176 defines a variable fluid damping volume 182 in the valve assembly 132 which has a damping piston 184 slidably received therein reciprocal relative thereto by a damping link 186 connected at one end thereof through a lost motion stop member 187 to the piston 184 and at the opposite end thereof to the lifting nut 164. The variable damping volume 182 is fluidly communicated with another variable volume cavity 188 on the opposite side of the piston 184 through an orifice 189 therein when the piston 184 is intermediate the heads on member 187. The volume 182 also is communicated with jack cavity 100 through means including a plug 190 in the upper open end of the guide 176 having a cavity 191 therein communicating the jack cavity 100 through an opening 192 which communicates with the space above the piston 184. A check valve member 195 in cavity 191 blocks flow from cavity 100 through opening 192. The inner surface of the plug 190 is swaged over at 193 to retain the valve member 195 in place.

One aspect of the present invention is that a predetermined fluid level is maintained in the reservoir bulb space 76 which is acted upon by a compressible air pocket thereabove to produce a predetermined precharged pressure in the reservoir 68, the cylinder 42 of the shock absorber and the variable volume cavity 100 in the jack assembly 80. By the provision of such a precharged condition, the jack components can have a reduced size in that the effective area of the jack piston is always acted on by the precharged pressure to establish an initial force for carrying a substantial portion of the load on the sprung mass when the jack is fully retracted. This basic load carrying ability of the jack unit 82 is supplemented by fluid displacement from the shock absorber 24 into the jack unit 80 to produce an additional load carrying characteristic under variable loading conditions. The reduced dimensions of the jack unit are such that reduced fluid displacements into and out of the jack will be required to produce adequate jack movements for maintaining a predetermined height relationship whereby the unit is very responsive even in cases where there is little relative movement between the sprung and unsprung masses as, for example, when a vehicle passes over a smooth road. In one working embodiment the suspension spring 22 has a normal load carrying capacity of 1075 pounds and the suspension unit has the reservoir 76 charged to 100 p.s.i. The working embodiment has a tubular jack piston 84 with an I.D. of 3.35 inches and a maximum O.D. of 4.5 inches at the point where spring seat 93 connects. The spring load, precharge in the reservoir 76 and diameters of the tubular jack member 84 are merely illustrative of how prepressurization of the self-pumping suspension unit 20 maintains the outside dimensions of the jacking component 80 within reasonable limits.

Another feature of the precharge is that it minimizes harshness in the suspension unit during the shock absorber compression stroke. With the jack piston of reduced area and a precharge the pumping force on compression is less than it would be without the precharge. Such a reduced pumping force produces a suspension unit having desirably smooth ride characteristics. Furthermore, the precharge in the system produces a restoring force on the shock absorber piston during its rebound stroke that enables the load carrying capacity of spring 22 to be slightly reduced to further smooth the ride.

When the suspension unit 20 is at a first predetermined loading on the sprung mass as, for example, when the vehicle is empty, the pressure in the variable volume jack cavity 100 is maintained at a related balancing pressure which is in excess of the precharged pressure in the reservoir bulb 74. When additional loading is placed on the sprung mass, an instantaneous pressure increase occurs in the cavity 100 by the spring 22 directing a greater force against the movable spring seat 93. The increased pressure in the cavity 100 is directed against the diaphragm 146 in the valving assembly to maintain the valving element 136 in a closed position against the opening force of the constant bias spring 154 and extension spring 174. The relative movements between the sprung and unsprung masses will then cause the piston 44 to direct fluid through the base valve assembly 54 through openings 77, 79, groove 113 and space 106 into cavity 100 whereby the jack piston 84 is displaced upwardly with respect to the jack tube 82 to adjust the spring seat 93 to a load carrying position to compensate for any deflection in the primary coil spring 22 so as to cause the sprung mass to return to a predetermined height relationship with respect to the unsprung mass.

During the adjustment of the spring seat 93 produced by additional loading on the sprung mass, the snap ring assembly 114 is moved by the jack piston 84 to cause the spring guide 178 to be moved away from the closed valving element 136 whereby the modulating or extension spring 174 is moved into a more extended position to produce a greater opening force on the valving element 136. When the spring 174 reaches a predetermined extended position because of the pumping up of the jack assembly 80, a valve opening force is produced capable of overcoming the valve closing action of the diaphragm 146 under the increased loading conditions. At this time, upon additional pumping action of the shock absorber unit 24 fluid displaced into the cavity 100 raises the jack piston 84 a slight amount so that the valve is subjected to a greater opening action than closing action as produced by the diaphragm 146 because of a slight movement of the extension spring 174 from its balanced position whereby the valving element 136 is displaced upwardly to open the passageway 134 from the cavity 100 to bleed pump fluid into the cavity 100 back into the reservoir space 68.

While spring seat adjustment may fully compensate for deflection of spring 22, the spring rate of spring 174 can also be selected to open the valve 136 before the movable seat 93 is moved to fully compensate for additional loading. Such an arrangement is desirable where there is no load compensation provision on the front end of a vehicle. In such a case where two passengers are in the front seat of a vehicle such as that shown in FIGURE 1, the loading on the front end can cause the front end to nose down. If the rear levelers were to fully compensate for additional rear loading, the nose down effect would be accentuated. To minimize this effect, only a partial leveling can be built in the rear levelers by properly selecting the rate of spring 174 in which case the attitude of the vehicle from front to rear is maintained lower but more even than would be the case with full compensation In accordance with certain other principles of the present invention, upon valve opening action, the damping piston 184 is moved to the position shown in FIGURE 5 to seat against the lower shoulder on stop member 187 whereby additional valve opening movement forces fluid from volume 182 through orifice 192 to hydraulically damp large amplitude valve opening movements that might produce an undesirable exhaust of fluid from the cavity 100 that would cause the movable spring seat 93 to be moved an undesirable distance from its adjusted position for maintaining the predetermined height relationship between the sprung and unsprung masses. On valve closing movement piston 184 is shifted upward against the upper head of the member 187 so that fluid flows from chamber 188 into volume 182 across orifice 189 in piston 184 and an opening 191 in the top head of the member 187. The fluid path is relatively unrestricted whereby the valve return or closing movement occurs without any substantial fluid damping delay. By virtue of this arrangement, the valve opening movement is minimized whereby the valve assembly 132 closely controls the fluid discharged from the cavity 100 to prevent undesirable overshoot movements of the spring seat 93.

Another feature of the illustrated valve damping arrangement is that when the sprung mass of the vehicle is displaced relative to the unsprung mass as, for example, when the vehicle passes around a long curve, the jack unit which has a reduced loading thereon is retracted under the control of valve assembly 132 and the jack unit with increased loading thereon is extended to maintain a stable vehicle attitude in the curve.

While the change in jack positions in the curve is desirable, such change preferably is maintained within predetermined limits to allow for a fairly quick return of the movable spring seat 93 to level straight away loadings. By virtue of the hydraulic damping piston 184 in the control valve assembly 132 means are present to limit fluid exhaust from the lightly loaded unit so as to prevent an undue height differential between the movable spring seats on the two rear suspension units 16.

More particularly, in the lightly loaded unit, the exhaust valve 136 will open and bleed fluid from the jack cavity 100 into the reservoir space 68. As this occurs, the aforedescribed hydraulic damping of valve opening will occur. Additionally, as the jack piston 84 is retracted, the spring guide 178 will be moved downwardly with respect to the damper piston 84 to produce a hydraulic link between the jack piston 84 and the link 186 that transmits a substantial valve closing force against valve 136. This maintains valve 136 closed irrespective of a reduced jack pressure being present on diaphragm 146. As fluid bleeds from damping volume 182 through orifice 192, the valve 136 is forced open by springs 174 and 154 whereby jack fluid is exhausted under a modulated control into the reservoir space 68. Thus, jack retraction is delayed as the vehicle passes through the curve thereby enabling the lightly loaded unit to more quickly return to normal loading extension when the vehicle returns to a straight road.

When the loading is removed from the sprung mass, the force acting on the movable spring seat 93 is reduced along with the pressure in the cavity 100. This produces a lesser valve closing action by the diaphragm 146. Hence, the modulating or valve extension spring 174 and constant bias spring 154 will move the valving element 136 to its open position against the damping action of the piston 184 and check valve 192 to cause fluid in the cavity 100 to be exhausted back into the pressurized reservoir 68 whereby the jack cylinder 86 moves to a retracted position. When a predetermined amount of fluid has been exhausted from the cavity 100, the valve opening force of the extension spring 174 and that of the bias spring 154 is rebalanced by the valve closing force of the pressure in the cavity 100 acting on the diaphragm 146. At this point, the movable spring seat 93 is adjusted to a position wherein the sprung mass is located at the desired height relationship with respect to the unsprung mass for the lesser loading condition.

The valve assembly 132 is pulsatingly controlled from the balanced condition shown in FIGURE 5 by variations in the pressure in the cavity 100 produced by continual displacement of fluid thereto by the pumping action of the shock absorber 24.

Another feature of the present invention occurs when the jack unit 80 is fully retracted. At this time the ring assembly 114 engages the upper end of the filler ring 102 and the guide member 178 engages the upper end of the spring seat 166 to move it downwardly on the nut 164 a predetermined distance whereby the spring 172 is compressed to hold the valve 136 closed. When the vehicle begins to move, the shock absorber 24 will discharge fluid into the jack cavity 100. The valve 136 is held closed until the cavity 100 is filled with sufficient fluid to cause the jack piston 84 to move upwardly a sufficient distance to move the member 178 away from spring seat 166. When this occurs the spring 172 shifts the seat 166 into the position shown in FIGURE 5 and the valve 136 is then controlled by springs 154, 176 and diaphragm 146 as previously discussed.

While the embodiment of the present invention as herein disclosed constitutes a preferred form, it is to be understood that other forms might be adopted.

What is claimed is as follows:

1. In a combination shock absorber and fluid suspension unit the combination of, a shock absorber having an outer cylindrical surface with a large diameter at one end thereof and a small diameter at the opposite end thereof, a pumping cylinder arranged coaxially of said outer surface in spaced relationship therewith to form a small volume fluid reservoir and a large volume fluid reservoir communicated through a space between said small diameter surface and said pumping cylinder, a piston rod extending exteriorly of said pumping cylinder having a first support mount on one end thereof adapted to be connected to a sprung mass, a second support mount on the end of the small diameter outer surface adapted to be connected to an unsprung mass, a piston on said piston rod reciprocably mounted in said cylinder to form spaced apart variable volume compartments, means fluidly communicating the interior of said pumping cylinder with said fluid reservoirs, a fluid outlet from one of said compartments through which fluid is discharged by said piston upon normal high frequency movements between the sprung and unsprung masses, a movable tubular jack piston member surrounding said small diameter outer cylindrical surface including a portion thereon spaced from said surface to form a pressurizable variable volume cavity between said piston member and cylindrical surface, means for sealing the opposite ends of said piston member for preventing leakage exteriorly of said pressurizable cavity, spring means supported between said tubular jack piston member and said first support mount for directing a predetermined portion of the weight of the sprung mass against said movable jack piston member for pressurizing said cavity, and fluid control means responsive to the pressure in said cavity for controlling flow of fluid between said reservoir and said pressurizable cavity for moving said tubular member into a predetermined relationship with the shock absorber to maintain a predetermined height relationship between the sprung and unsprung masses.

2. In a combination shock absorber and fluid suspension unit the combination of, cylinder means forming a chamber, a piston adapted to be reciprocated within said chamber including means thereon for dividing said chamber into two variable volume compartments, means including valve means for controlling fluid flow between said compartments upon reciprocation of said piston with respect to said cylinder means to produce a predetermined damped movement therebetween, prepressurized reservoir means, means communicating said reservoir means with one of said variable volume compartments for producing a restoring force on said piston upon movement thereof in a first direction, means for continually directing fluid from said one of said two variable volume compartments exteriorly of said chamber, a piston rod directed from said cylinder means having one end thereof connected to said piston and the opposite end thereof adapted to be connected to a sprung mass, support means on the opposite end of said cylinder means adapted to be connected to an unsprung mass, a tubular jack piston member surrounding said cylinder means being reciprocable relative thereto and having a portion thereon spaced from said cylinder means forming a variable volume pressurizable cavity, means for sealing the ends of said tubular jack piston member for preventing fluid leakage exteriorly of said pressurizable cavity, spring means supported between said piston rod and said jack piston member for causing said piston rod and said tubular element to be biased apart, said spring means serving to direct a predetermined amount of the weight of the unsprung mass against said jack piston member to pressurize said cavity, and fluid control means responsive to the weight of the sprung mass including means operative to direct a predetermined amount of the pressurized fluid in said cavity into said reservoir means to move said jack piston member relative to the sprung mass.

3. In a combination shock absorber and fluid suspension system, the combination of, a shock absorber having relatively movable cylinder and piston members adapted to be connected respectively to an unsprung and a sprung mass and including means therein responding to relative movement between the sprung and unsprung masses for damping such movements, a prepressurized reservoir, means for directing a predetermined amount of fluid from interiorly of said reservoir into said shock absorber during the damping action thereof to produce a restoring force on said piston during its rebound movement, a main suspension spring supportingly receiving the weight of the sprung mass, a load carrying piston cylinder unit having a pressurizable variable volume cavity therein and including a portion thereof adapted to supportingly receive said suspension spring, means for communicating the pressurizable cavity of the load carrying piston cylinder unit with said shock absorber cylinder whereby relative movement of said piston directs fluid from said cylinder into said unit, means for controlling fluid flow between said pressurizable load carrying piston cylinder unit and said reservoir including a valving element, and means responsive to changes in the weight of the sprung mass and operative to position said valving element to maintain the pressure in said cavity in accordance with the weight of the sprung mass whereby a desired height relationship is produced between the sprung mass and an associated unsprung mass.

4. In a combination shock absorber and fluid suspension system the combination of, a shock absorber having relatively movable cylinder and piston members adapted to be connected respectively to an unsprung and a sprung mass and including means therein responding to relative movement between the sprung and unsprung masses for damping such movements, a prepressurized reservoir, means for directing a predetermined amount of fluid from interiorly of said reservoir into said shock absorber during the damping action thereof to produce a restoring force on said piston during its rebound movement, a main suspension spring supportingly receiving the weight of the sprung mass, a load carrying piston cylinder unit having a pressurizable variable volume cavity therein and including a portion thereof adapted to supportingly receive said suspension spring, means for communicating the pressurizable cavity of the load carrying piston cylinder unit with said shock absorber cylinder whereby relative movement of said piston directs fluid from said cylinder into said unit, means for controlling fluid flow between said pressurizable load carrying piston cylinder unit and said reservoir including a valving element, a diaphragm means responsible to the pressure in said unit for biasing said valving element closed, a modulating spring associated with said valving element for balancing the action of said diaphragm means for selectively maintaining a predetermined pressure in the pressurizable cavity of the load carrying cylinder and piston unit for maintaining a predetermined height relationship between the sprung and unsprung masses.

5. A combination shock absorber and fluid suspension unit comprising cylinder means forming a chamber, a piston adapted to be reciprocated within said chamber including means thereon for dividing said chamber into two variable volume compartments, a fluid outlet from one of said compartments, enclosure means forming a reservoir surrounding said cylinder means, means for prepressurizing said reservoir, means for communicating said reservoir with said one of said compartments upon movement of said piston in a first direction for producing a restoring force thereon, a tubular jack piston member surrounding said enclosure means being relatively reciprocable with respect thereto, said tubular jack piston member having a portion thereon in spaced relationship to the outer surface of said enclosure means for forming a variable volume pressurizable cavity therebetween communicating with said fluid outlet whereby reciprocation of said piston directs fluid into said cavity, seal means on either end of said tubular member for preventing fluid leakage exteriorly of said pressurizable chamber, fluid control means including a valve responsive to changes in the weight on a sprung mass associated with the shock absorber for controlling flow between said reservoir and said pressurizable cavity for producing a predetermined movement of said tubular jack piston member, and spring means supported on said movable tubular member adjustable thereby to act on the sprung mass to move it with respect to an unsprung mass for maintaining a predetermined height therebetween, said fluid control means including means forming a passageway communicating said pressurizable cavity with said reservoir, valve means opening and closing said passageway to fluid flow therethrough, a first control spring means biasing said valve means open, diaphragm means responsive to pressure in said cavity biasing said valve closed and a second control spring means responsive to movement of said jack piston for balancing the resultant force of said valve means to maintain a predetermined pressure in said cavity for producing the desired height relationship between the sprung and unsprung masses.

6. A combination shock absorber and fluid suspension unit comprising cylinder means forming a chamber, a piston adapted to be reciprocated within said chamber including means thereon for dividing said chamber into two variable volume compartments, a fluid outlet from one of said compartments, enclosure means forming a fluid reservoir surrounding said cylinder means, means for communicating said reservoir with said one of said compartments upon movement of said piston in a first direction, a tubular jack piston member surrounding said enclosure means being relatively reciprocable with respect thereto, said tubular jack piston member having a portion thereon in spaced relationship to the outer surface of said enclosure means for forming a variable volume pressurizable cavity therebetween communicating with said fluid outlet whereby reciprocation of said piston directs fluid into said cavity, seal means on either end of said tubular member for preventing fluid leakage exteriorly of said pressurizable cavity, fluid control means responsive to changes in the weight on a sprung mass associated with the shock absorber for controlling flow between said reservoir and said pressurizable cavity for producing a predetermined movement of said tubular jack piston member, and spring means supported on said movable tubular member adjustable thereby to act on the sprung mass to move it with respect to an unsprung mass for maintaining a predetermined height therebetween, a filler ring within said variable volume jack cavity fixedly secured to one end of said shock absorber unit, a snap ring carried by said jack piston, means for fixing said snap ring to said filler ring for preventing relative rotation between said snap ring and said jack piston, an opening through said filler ring in communication with said cavity, said fluid control means including means forming a passageway communicating said pressurizable cavity with said reservoir through said filler ring opening, valve means located in said filler opening for opening and closing said passageway to fluid flow therethrough, first control spring means for biasing said valve means open, diaphragm means responsive to pressure in said cavity biasing said valve closed, a guide member secured to said snap ring, and second control spring means connected between said guide member and said valve means responsive to movement of said jack piston for balancing the resultant forces on said valve means to maintain a predetermined pressure in said cavity for producing the desired height relationship between the sprung and unsprung masses.

7. A combination shock absorber and fluid suspension unit comprising cylinder means forming a chamber, a piston adapted to be reciprocated within said chamber including means thereon for dividing said chamber into two variable volume compartments, a fluid outlet from one of said compartments, means forming a fluid reservoir surrounding said cylinder means, means for communicating said reservoir with said one of said compartments upon movement of said piston in a first direction, a tubular jack piston member surrounding said enclosure means being relatively reciprocable with respect thereto, said tubular jack piston member having a portion thereon in spaced relationship to the outer surface of said enclosure means for forming a variable volume pressurizable cavity therebetween communicating with said fluid outlet whereby reciprocation of said piston directs fluid into said cavity, seal means on either end of said tubular member for preventing fluid leakage exteriorly of said pressurizable cavity, fluid control means responsive to changes in the weight on a sprung mass associated with the shock absorber for controlling flow between said reservoir and said pressurizable cavity for producing a predetermined movement of said tubular member, spring means supported on said movable tubular member adjustable thereby to act on the sprung mass to move it with respect to an unsprung mass for maintaining a predetermined height therebetween, said fluid control means including means forming a passageway communicating said pressurizable cavity with said reservoir, valve means opening and closing said passageway to fluid flow therethrough, first control spring means biasing said valve means open, diaphragm means responsive to pressure in said cavity biasing said valve closed and a second control spring means responsive to movement of said jack piston for balancing the resultant force of said valve means to maintain a predetermined pressure in said cavity for producing the desired height relationship between the sprung and unsprung masses, said fluid control means further including means for damping valve opening movement, said damping means including a tubular damping element fixed to said jack piston for movement therewith and a damping piston slidably supported therein for forming a variable volume damping chamber therein, link means connecting said damping piston to said valve means, orifice means for controlling fluid flow from said variable damping chamber operative upon a predetermined valve opening movement to damp such movement, said tubular damping element being movable with respect to said damping piston and link upon jack retraction for producing a predetermined valve closing force through said piston and link dependent upon flow from said damping chamber across said orifice means whereby jack retraction is maintained under the control of fluid flow through said orifice means.

8. In a combination shock absorber and fluid suspension unit the combination of, a shock absorber having an outer cylindrical surface, a pumping cylinder arranged coaxially of said outer surface in spaced relationship therewith to form a fluid reservoir, means for prepressurizing said reservoir, a piston rod extending exteriorly of said pumping cylinder having a first support mount on one end thereof adapted to be connected to a sprung mass, a second support mount on the end of said outer surface adapted to be connected to an unsprung mass, a piston on said piston rod reciprocably mounted in said cylinder to form variable volume compartments therein, a fluid outlet from one of said compartments through which fluid is discharged by said piston upon normal high-frequency movements between the sprung and unsprung masses, a movable tubular jack piston member surrounding said outer cylindrical surface including a portion thereon spaced from said surface to form a pressurizable variable volume cavity between said jack piston member and said outer cylindrical surface, means for sealing the opposite ends of said piston member for preventing leakage exteriorly of said pressurizable cavity, spring means supported between said tubular jack piston member and said first support mounting for directing a predetermined portion of the weight of the sprung mass against said movable jack piston member for pressurizing said cavity, fluid control means responsive to the pressure in said cavity for controlling flow of fluid between said reservoir and said pressurizable cavity for moving said tubular jack piston member into a predetermined relationship with the shock absorber to maintain a predetermined height relationship between the sprung and unsprung mass, said fluid control means including means forming a passageway communicating said pressurizable cavity with said reservoir, valve means opening and closing said passageway to fluid flow therethrough, first control spring means biasing said valve means opened, diaphragm means responsive to pressure in said cavity biasing said valve closed and a second control spring means responsive to movement of said jack piston for balancing the resultant force of said valve means to maintain a predetermined pressure in said cavity for producing the desired height relationship between the sprung and unsprung masses.

9. In a combination shock absorber and fluid suspension unit the combination of, a shock absorber having an outer cylindrical surface, a pumping cylinder arranged coaxially of said outer surface in spaced relationship therewith to form a fluid reservoir, means for prepressurizing said reservoir, a piston rod extending exteriorly of said pumping cylinder having a first support mount on one end thereof adapted to be connected to a sprung mass, a second support mount on the end of said outer surface adapted to be connected to an unsprung mass, a piston on said piston rod reciprocably mounted in said cylinder to form variable volume compartments therein, a fluid outlet from one of said compartments through which fluid is discharged by said piston upon normal high-frequency movements between the sprung and unsprung masses, a movable tubular jack piston member surrounding said outer cylindrical surface including a portion thereon spaced from said surface to form a pressurizable variable volume cavity between said jack piston member and said outer cylindrical surface, means for sealing the opposite ends of said piston member for preventing leakage exteriorly of said pressurizable cavity, spring means supported between said tubular jack piston member and said first support mounting for directing a predetermined portion of the weight of the sprung mass against said movable jack piston member for pressurizing said cavity, fluid control means responsive to the pressure in said cavity for controlling flow of fluid between said reservoir and said pressurizable cavity for moving said tubular jack piston member into a predetermined relationship with the shock absorber to maintain a predetermined height relationship between the sprung and unsprung mass in accordance with the weight of the unsprung mass, a filler ring within said variable volume jack cavity fixedly secured to one end of said shock absorber unit, a snap ring carried by said jack piston member, means for fixing said snap ring to said filler ring for preventing relative rotation between said snap ring and said jack piston, an opening through said filler ring in communication with said cavity, said fluid control means including means forming a passageway communicating said pressurizable cavity with said reservoir through said filler ring opening, valve means located in said filler ring opening for opening and closing said passageway to fluid flow therethrough, first control spring means for biasing said valve means open, diaphragm means responsive to pressure in said cavity biasing said valve means closed, a guide member secured to said snap ring, and second control spring means connected between said guide member and said valve means responsive to movement of said jack piston for balancing the resultant forces on said valve means to maintain a predetermined pressure in said cavity for producing the desired height relationship between the sprung and unsprung masses.

10. In a combination shock absorber and fluid suspension unit the combination of, a shock absorber having an outer cylindrical surface, a pumping cylinder arranged coaxially of said outer surface in spaced relationship therewith to form a fluid reservoir, means for prepressurizing said reservoir, a piston rod extending exteriorly of said pumping cylinder having a first support mount on one end thereof adapted to be connected to a sprung mass, a second support mount on the end of said outer surface adapted to be connected to an unsprung mass, a piston on said piston rod reciprocably mounted in said cylinder to form variable volume compartments in said cylinder, a fluid outlet from one of said compartments through which fluid is discharged by said piston upon normal high-frequency movements between the sprung and unsprung masses, a movable tubular jack piston member surrounding said outer cylindrical surface including a portion thereon spaced from said surface to form a pressurizable variable volume cavity between said piston member and cylindrical surface, means for sealing the opposite ends of said piston member for preventing leakage exteriorly of said pressurizable cavity, spring means supported between said tubular jack piston member and said first support mounting for directing a predetermined portion of the weight of the sprung mass against said movable jack piston member for pressurizing said cavity, fluid control means responsive to the pressure in said cavity for controlling flow of fluid between said reservoir and said pressurizable cavity for moving said tubular member into a predetermined relationship with the shock absorber to maintain a predetermined height relationship between the sprung and unsprung mass in accordance with the weight of the unsprung mass, said fluid control means including means forming a passageway communicating said pressurizable cavity with said reservoir, valve means opening and closing said passageway to fluid flow therethrough, first control spring means biasing said valve means opened, diaphragm means responsive to pressure in said cavity biasing said valve closed and a second control spring means responsive to movement of said jack piston for balancing the resultant force of said valve means to maintain a predetermined pressure in said cavity for producing the desired height relationship between the sprung and unsprung masses, said fluid control means further including means for damping valve opening movement, said damping means including a tubular damping element fixed to said jack piston for movement therewith and a damping piston slidably supported therein for forming a variable volume damping chamber therein, link means to connect said damping piston to said valve means, orifice means for controlling fluid flow from said variable damping chamber operative upon a predetermined valve opening movement to damp such movement, said tubular damping member being movable with respect to said damping piston and link upon jack retraction for producing a predetermined valve closing force through said damping piston and link dependent upon flow from said damping chamber across said orifice means whereby jack retraction is maintained under the control of fluid flow through said orifice means.

References Cited

UNITED STATES PATENTS 2,592,391    4/1952    Butterfield _____ 267—65
3,179,401    4/1965    Bartram et al. _____ 267—65

ARTHUR L. LA POINT, *Primary Examiner.*

R. M. WOHLFARTH, *Assistant Examiner.*